J. OTREBA.
DETACHABLE HORSESHOE.
APPLICATION FILED MAY 26, 1918.
1,283,549.
Patented Nov. 5, 1918.
2 SHEETS—SHEET 1.
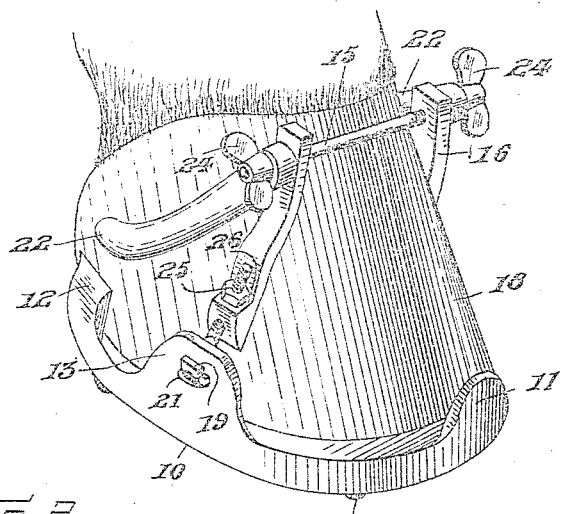
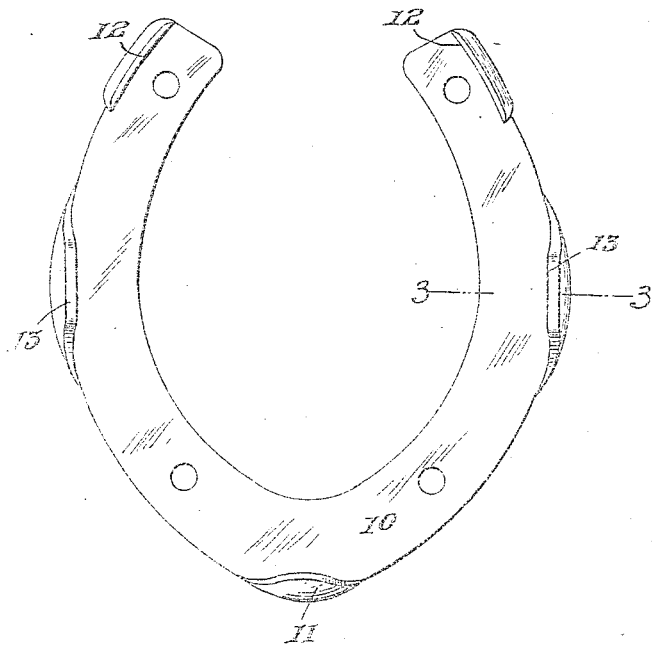
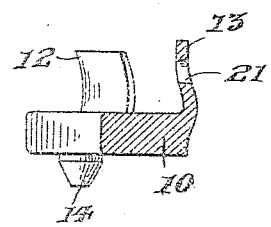
Inventor
J. Otreba
By R. M. Wilson
Attorney

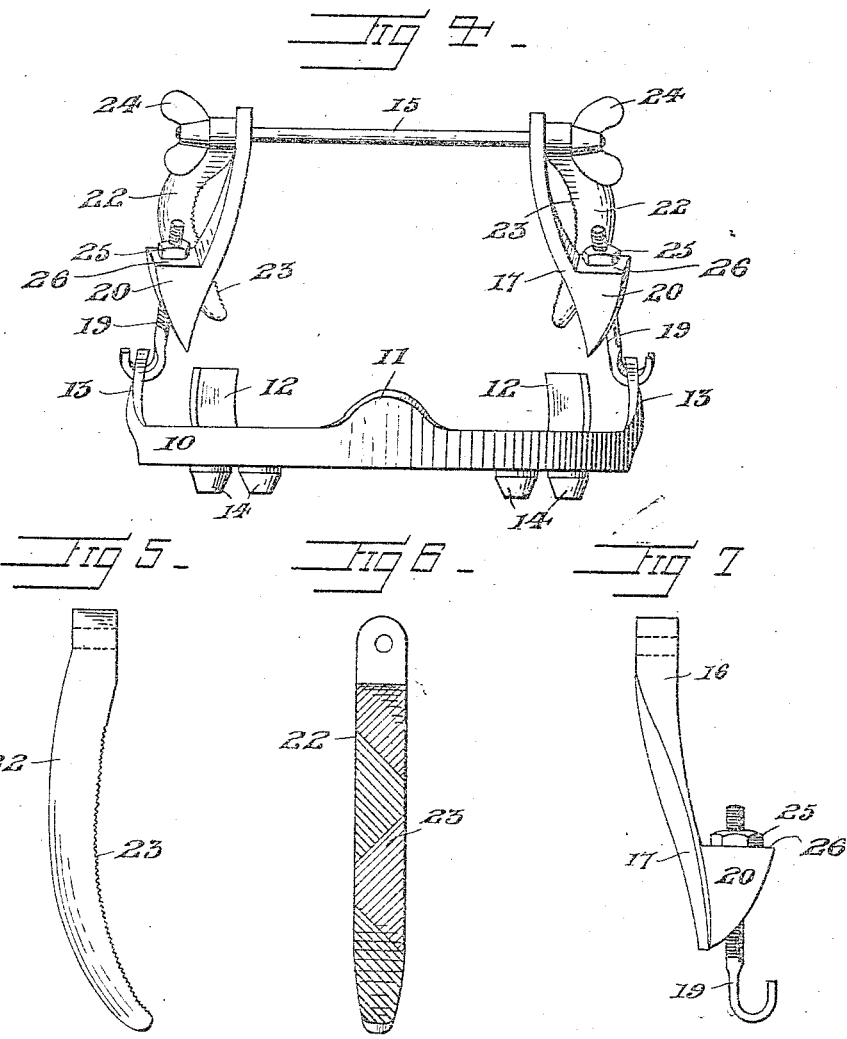

UNITED STATES PATENT OFFICE.

JOHN OTREBA, OF AMHERST, MASSACHUSETTS.

DETACHABLE HORSESHOE.

1,283,549.   Specification of Letters Patent.   Patented Nov. 5, 1918.

Application filed May 28, 1918. Serial No. 236,971.

*To all whom it may concern:*

Be it known that I, JOHN OTREBA, a subject of Emperor of Austria, residing at Amherst, in the county of Hampshire and State of Massachusetts, have invented certain new and useful Improvements in Detachable Horseshoes, of which the following is a specification.

The primary object of the invention is the provision of a shoe that is readily assembled upon a hoof of an animal without the employment of the usual horseshoe nails and providing means for adjustably securing the shoe quickly and easily upon the hoof.

A further object of the device is to provide a shoe for animals which can be readily placed in its operative position in such instances as upon losing a shoe when traveling along the road, the device possessing great strength and durability, and capable of affording all of the necessary functions of the ordinary horseshoe, such as non-slipping properties.

In the drawings:

Figure 1 is a perspective view of the device shown in the act of assembling upon a hoof;

Fig. 2 is a top plan view of the shoe with the attaching means removed;

Fig. 3 is a transverse sectional view taken upon line 3—3 of Fig. 2;

Fig. 4 is a front elevation of the complete device;

Fig. 5 is an elevational view of one of the clamping jaws;

Fig. 6 is a view of the inner side thereof; and

Fig. 7 is a view of one of the hooks and links employed with the device.

My horseshoe 10 is substantially of the usual form of such device having a forwardly positioned toe guard 11, but I also provide slightly inwardly inclined heel guards 12 and intermediately positioned attaching ears 13, while calks 14 are provided upon the bottom of the shoe to prevent slipping while the device is in use.

A bolt 15 is provided with depending sliding and swinging links 16 adjacent to opposite ends having inner curved faces 17 to engage the sides of the hoof, such as 18, while a hook 19 adjustably extends through a block 20 at the lower end of each link and is positioned through the perforation 21 of the adjacent ear 13.

A clamping jaw 22 is freely mounted upon the bolt 15 outwardly of each of the links 16 and has a suitably roughened curved inner face 23 adapted for fitting the adjacent portion of the hoof 18 when said jaws are extended rearwardly toward the guards 12 with the device in its operative position. Winged nuts 24 are threaded upon the opposite ends of the bolt 15 so that by tightening both of the nuts 24, the links 16 and the jaws 22 will be tightened upon the opposite sides of the hoof 18, firmly securing the shoe 10 upon the hoof in its usual operative arrangement. Adjusting nuts 25 are threaded upon the hooks 19 for seating upon the upper squared faces 26 of the blocks 20 for tightening the said hooks upon the ears 13 and drawing the shoe tightly against the hoof.

In this manner, the clamping jaws 22 taken with the links 16 form anchoring means upon the hoof 18 to which the shoe 10 is attached and adjusted by the hooks 19. The shoe 10 when positioned in this manner upon the hoof is firmly attached thereto for undergoing all conditions of travel of the animal, it being impossible to lose the shoe off of the hoof; and the entire structure possesses great strength and is easily attached upon the hoof as well as detached therefrom when desired.

What is claimed as new is:

1. The combination with a shoe having opposite perforated ears thereon, of a clamping bolt, depending links slidably mounted upon the bolt having curved inner faces adapted to engage an animal's hoof, blocks upon the lower ends of the links, hooks engaging the perforations of said ears adjustably positioned through said blocks, clamping jaws slidably mounted upon said bolt having roughened inner faces engaging the hoof, and adjusting nuts threaded upon the ends of the bolt outwardly of said jaws and links.

2. The combination with a horseshoe having inwardly curved positioning toe and heel guards adapted for engaging a hoof when positioned upon the shoe, and opposite intermediately positioned ears upon the shoe provided with perforations, of an operating bolt, a link and a jaw adapted for engaging a hoof swingingly mounted upon said bolt adjacent each of its opposite ends, adjusting nuts upon the free opposite ends of the bolt adapted for anchoring the jaws and links to a hoof when the device is operatively positioned thereon, blocks at the lower ends of the links, hooks positioned through said blocks engaging the perforations of said ears, and adjusting nuts threaded upon said hooks and seated upon the upper squared faces of said blocks.

In testimony whereof I affix my signature.

JOHN OTREBA.